United States Patent [19] [11] 3,979,196
Frank et al. [45] Sept. 7, 1976

[54] METHOD FOR THE HOT-WORKING OF GLASS
[75] Inventors: Berthold Frank; Bernhard Lersmacher, both of Aachen; Hans-Jürgen Lydtin, Stolberg, all of Germany
[73] Assignee: U.S. Philips Corporation, New York, N.Y.
[22] Filed: Nov. 17, 1975
[21] Appl. No.: 632,273

[30] Foreign Application Priority Data
Dec. 12, 1974  Germany............................ 2458787

[52] U.S. Cl. ............................... 65/25 R; 65/374 R
[51] Int. Cl.² ............................................ c03B 11/00
[58] Field of Search ................. 65/24, 25 R, 374 R, 65/25 A

[56] References Cited
UNITED STATES PATENTS
2,395,727   2/1946   Devol .............................. 65/182 A
3,186,818   6/1965   Havens et al. ...................... 65/25 R
3,254,981   6/1966   Havens .............................. 65/25 R
3,900,328   8/1975   Parsons et al. ..................... 65/68 X Primary Examiner—Arthur D. Kellogg
Attorney, Agent, or Firm—Frank R. Trifari

[57] ABSTRACT

The undulation of hot-moulded glass is avoided when the cooling of the glass edge layers in the first phase of the moulding operation is delayed and is accelerated after completed moulding. This is achieved by using a mould of a glassy carbon having a porous structure. Prior to the moulding, the pores are filled with a gas-forming liquid or a gas. The resulting gas film between the glass and the surface of the mould is removed ater completed moulding. The pores may subsequently be filled with a cooling agent.

6 Claims, No Drawings

METHOD FOR THE HOT-WORKING OF GLASS

The invention relates to a method for the hot-working of glass by means of a mould which consists of glassy carbon at least at its surface contacting the heated glass.

Tools for the hot-working of glass which consist of glassy carbon at least at their surface contacting the heated glass, as well as a device for manufacturing optical lenses of glass in which the walls of the cavity used for moulding consist of glassy carbon, are disclosed in German Auslegeschrift No. 2,257,453 and German Offenlegungsschrift No. 2,157,803. The excellent properties of glassy carbon may be explained in that a gas film in the form of hydrogen emanating from the glassy carbon is presumably formed between the glassy carbon and the hot glass, said film forming a kind of cushion between the hot glass and the tool. It has been found, however, that said effect is not always sufficient to form a cushion which is active in practice.

It is furthermore known that glassy carbon can be manufactured both in a compact form, (specific weight approximately 1.5g/cm$^3$) and as a foamed carbon (Chemie-Ingenieur-Technik 42 (1970) 659–669). In the above-mentioned glass-forming tools, however, only glassy carbon in a compact form is used, which appears from the frequent references to its surface quality.

For the manufacture of hollow glasses it is in addition known to use porous moulds of metal in the pores of which an evaporatable liquid is absorbed which is converted into a gaseous cushion by the heated glass body during its manufacture (German Auslegeschrift No. 1,078,291). Porous moulds of metal, however, suffer from the drawback of being subject to corosion even to a more considerable extent that compact metal moulds, so that they have a short lifetime and result in contamination of the glass body already after a short time in operation. This sensitivity to corrosion requires frequent and expensive after-treatments and moreover causes long down times (machine lying idle). A further drawback of metals is their good thermal conductivity which often results in the fact that between the surface, that is the contact surface with the mould, and the interior of the glass to be moulded high temperature differences occur. The latter results on the one hand in anisotropic shrinkage of the glass often accompanied by undulation in the surface region and on the other hand in "freezing-in of dangerous stresses", so in increased tendency to fracture.

It is an object of the invention to provide a method of hot-working glass in which the cooling of the glass edge layers is delayed in the first phase of the moulding operation and is accelerated after completed moulding.

According to the invention, this object is achieved in that the glassy carbon of the mould used has a porous structure, in which pore size and pore density (pore distribution) are adjusted so that during the moulding process the glass cannot penetrate into the surface, and the pores are accessible from the side of the mould remote from the heated glass, that prior to the moulding the pores are filled with a gas-forming liquid or a gas, and that the resulting gas film between the glass and the surface of the mould is removed after completed moulding.

It is furthermore of advantage to fill the pores, after removing the gas film, with a cooling agent, for example a cooling liquid.

A "porous" structure is to be understood to mean herein a pore characteristic which is distinguised from the intrinsic porosity of the glassy carbon in that the average (statistic) pore diameter is very much larger than that of the "intrinsic" pores of a few 10A (10 to 50A) and lies substantially approximately in the range of the average pore diameter of approximately 0.1 mm to a few mm.-A distribution in this range may also occur.

The invention is consequently based on the idea to use glassy carbon for a series of manufacturing steps in hot-working softened glass and also quartz glass, which carbon consists essentially of two phases of which one (material phase) consists for a predominant part of glassy carbon, while the second (pore phase) represents a system of cavities communicating with each other (communicating pore system). The "material phase" may also be considered as a matrix in which a "cavity phase" of a given characteristic is embedded.

The mould used in the method according to the invention consists advantageously of several segments (parts). This has the advantage that moulds of a small symmetry (complicated geometry)- for example, moulds for lamp envelopes - can be composed. Simultaneously, recesses, for example, grooves, may be provided which facilitate the supply of the cooling agent which can also be applied at an increased pressure (for example 1 to 10 atm).

The method according to the invention is based on the adaptability of the foamed material of glassy carbon to the requirements of the glass working methods. This means that in manufacturing the foamed material the pore characteristic, the density, as well as the shape and homogeneity can be varied considerably and hence the thermal conductivity, the mechanical stability and the capacity and transparency for gaseous and liquid cooling and lubricating agents can be adjusted within certain limits. Of course, pore size and pore density in the matrix should be adjusted so that the glass during the moulding process cannot penetrate into the porous wall. For technical reasons of production it is desirable for the glass not to cool or to cool only slightly during the actual working (moulding) process in order that it maintains its good flow properties. On the other hand, the moulded glass, after completion of said operation, should be cooled as rapidly as possible in order that it can be taken out of the matrix without deformation after a short time. Good results are obtained by using foamed material whose average pore diameter is approximately from 0.1 to 2mm, and in particular from 0.1 to 0.5mm, and whose density is from approximately 0.2 to 1.2 g/cm$^3$.

These wishes are met by the material used in the method according to the invention since it has a comparatively poor thermal conductivity. Said thermal conductivity is between $10^{-4}$ and $10^{-3}$ cal.°C$^{-1}$.cm$^{-1}$.s$^{-1}$ in accordance with the density. Due to the comparatively poor thermal conductivity too rapid a cooling of the glass edge layers in the first phase of the moulding operation is avoided. This effect is additionally intensified in that between the glass and the porous matrix a heat damping gas film is produced which in addition reduces the friction between glass and matrix considerably. Such gas films are formed in that gas-forming liquids are incorporated in the pores of the matrix or gases are blown into the porous matrix.

Suitable liquids are water and oil. As gases can be used water vapour or oil vapour. Water and water vapour are to be preferred. Oil and oil vapour may decompose pyrolytically at higher temperatures and possibly cause a partial clogging of the pores. The uniform distribution of said liquids or gases is ensured by the system of pores itself. At the same time, the mould material experiences an additional cooling according to the principle of the evaporation cooling (taking up heat of evaporation from the mould). The selected gases and liquids are inert against glassy carbon under the prevailing operating conditions and hence protect the matrix simultaneously against oxidative attack.

The rapid cooling required in the subsequent step of the process is advantageously carried out in the method according to the invention in that after the complete moulding the gas film between the glass and the matrix is removed. This can be achieved by opening the porous mould. As the result of this a more direct contact between the glass and the matrix is produced so that the comparatively higher thermal conductivity of the glassy carbon foam ensures a more rapid heat dissipation. This effect can even be improved by the addition of cooling liquids in the system of pores. Heat pipe-like evaporation and condensation processes can additionally increase the thermal conductivity of the said system considerably. A cooling liquids may be used the usual heat conductive materials, for example, as mentioned in Kirk-Ohmer, Encyclopedia of Chem. Technology, sec. Edition, Vol. 10, pp. 846–861. Examples of suitable cooling agents are biphenyl, biphenyloxide, and chlorinated biphenyls.

The material used in the method according to the invention for the hot-working and moulding, respectively, of glass ensures, with optimum matching to the process in question, a sufficient heat damping during the moulding, a high mechanical stability, a low or negligibly low detrition high corrosion (oxidation) resistance, sufficient permeability for cooling agent, any design, and high fidelity as to shape. These important properties correspond to the complex steps in the forming process optimally. Particularly advantageous is the application of the method according to invention to partly or fully automatic glass moulding machines, for example automatic machines for manufacturing lamp envelopes.

The invention will now be described in greater detail with reference to embodiments.

EXAMPLE 1

In a hollow mould which was lined with foamed material of glassy carbon (density $0.6 g/cm^3$, average pore diameter approximately 0.3mm), were blown the following types of glass:
 a. a soft borosilicate glass
 b. slightly harder borosilicate glasses which are available commercially as Pyrex and Duran, respectively
 c. a soft soda-lime silicate glass which is marketed, for example, by the Ruhrglas AG as type AR glass.

The hollow mould did not show any signs of detrition even after having been used 30 times. The sliding was particularly good when the lining was previously soaked with water. Soft glasses could be better worked than hard ones.

EXAMPLE 2

Solid glass rods of the types of glass mentioned in Example 1 were calibrated by rolling between jaws or porous glassy carbon (density approximately $0.8 g/cm^3$, pore size approximately 0.2 mm). Results as in Example 1.

What is claimed is:

1. A method for the hot-working of glass by means of a mould which consists of glassy carbon at least at its surface contacting the heated glass, characterized in that the glassy carbon of the mould used has a porous structure, in which pore size and pore density (pore distribution) are adjusted so that during the moulding process the glass cannot penetrate into the surface, and the pores are accessible from the side of the mould remote from the heated glass, that prior to the moulding the pores are filled with a gas-forming liquid or a gas, and the resulting gas film between the glass and the surface of the mould is removed after completed moulding.

2. A method as claimed in claim 1, characterized in that the porous, glassy carbon used has an average pore diameter of 0.1 to 2mm and a density of approximately 0.2 to $1.2 g/cm^3$.

3. A method as claimed in claim 1 characterized in that the gas-forming liquid is water or oil and the gas is selected from water vapour and oil vapour.

4. A method as claimed in claim 1 characterized in that after removing the gas film the pores are filled with a cooling agent.

5. A method as claimed in claim 4, characterized in that the cooling agent is introduced in the porous mould at an elevated pressure after the actual moulding process.

6. A method as claimed in claim 1 characterized in that the mould used is composed of several parts.

\* \* \* \* \*